United States Patent [19]

Thompson

[11] Patent Number: 4,949,190
[45] Date of Patent: Aug. 14, 1990

[54] COLLATION OF BUFFERED MULTI-PAGE DOCUMENTS

[75] Inventor: John R. Thompson, Webster, N.Y.

[73] Assignee: Eastman Kodak Company, Rochester, N.Y.

[21] Appl. No.: 275,845

[22] Filed: Nov. 25, 1988

[51] Int. Cl.$^5$ .......................... H04N 1/41; H04N 1/10
[52] U.S. Cl. ..................................... 358/426; 358/400; 358/498
[58] Field of Search ............... 358/400, 401, 426, 443, 358/444, 448, 4798

[56] References Cited

U.S. PATENT DOCUMENTS

| | | | |
|---|---|---|---|
| 4,439,865 | 3/1984 | Kikuchi et al. | 355/323 |
| 4,602,776 | 7/1986 | York et al. | 355/323 |
| 4,693,590 | 9/1987 | Umeda | 355/323 |
| 4,695,895 | 9/1987 | Nagashima | 358/426 |
| 4,705,393 | 11/1987 | Ito | 355/314 |
| 4,712,908 | 12/1987 | Nakayama et al. | 355/319 |
| 4,893,153 | 1/1990 | Sales et al. | 355/325 |

Primary Examiner—Alvin Oberley
Assistant Examiner—Randall S. Svihla
Attorney, Agent, or Firm—Milton S. Sales

[57] ABSTRACT

The number of pages of a multi-page document which can be stored in a buffer memory, when one or more of the pages of the document is substantially non-compressible, is increased by the invention. A machine, which is adapted to reproduce multi-page documents from image data of interleaved compressible and substantially non-compressible types of pages, includes multi-page buffer memory. The image data of the compressible page type is compressed and stored in the buffer memory. All pages of one type, either compressible or substantially non-compressible, are reproduced and the reproductions stored. Then, all the pages of the other type are reproduced, during which time, the stored reproductions of the one type page are delivered seriatim from storage into the reproduction document in collated fashion at the position corresponding to the position of the associated original in the multi-page document.

4 Claims, 2 Drawing Sheets

COLLATION OF BUFFERED MULTI-PAGE DOCUMENTS

CROSS-REFERENCE TO RELATED APPLICATION

Reference is made to commonly assigned U.S. Pat. application No. 07/275,850, now U.S. Pat. No. 4,893,153, entitled COLLATION OF MULTI-PAGE DOCUMENTS filed in the names of M. Sales and J. Thompson on even date herewith.

TECHNICAL FIELD

This invention relates generally to the production of mixed jobs of multi-page documents, and more particularly to the efficient utilization of multi-page buffer memory.

BACKGROUND ART

Electronic printers receive image data from computer work stations, word processors, and the like, which generally produce print jobs as character code signals for storage in a print server to be spooled one page at a time to a pattern generator for conversion to a rasterized video data stream. Electronic copiers receive image data from scanners, which convert the image on an original to a video data stream. The video data for printers and/or copiers may be stored in multi-page buffer memories. When a plurality of sets of a multi-page document are to be produced, the stored data for each page are repeatedly sent to the printer in proper page order such that the reproduction sets are automatically collated.

The number of pages which can be stored for a single job is limited by the size of the buffer memory and the memory space required per page. Accordingly, it is known to compress the data before storage, and to expand the data as it is withdrawn from storage. The compression ratio varies from original to original. Some pages, such as those containing continous tone images, may in fact, have a compression ratio less than one if subjected to many of the popular data compression algorithms. When these pages are present in a stored document, the number of pages which fit in buffer storage is greatly reduced.

DISCLOSURE OF INVENTION

It is an object of the present invention to increase the number of pages of a multi-page document which can be stored in a buffer memory when one or more of the pages of the document is substantially non-compressible. As used herein, the phrase "substantially non-compressible" is not limited to near one-to-one compression ratio or worse, but rather a compression ratio which is substantially lower than the average page of the document.

In accordance with one aspect of the present invention, a machine, which is adapted to produce multi-page documents from image data of interleaved compressible and substantially non-compressible types of pages, includes multi-page buffer memory and means for compressing and storing in the buffer memory the image data of the compressible page type. All pages of one type, either compressible or substantially non-compressible, are produced and stored. Then, all the pages of the other type are produced, during which time, the stored pages of the said one type are delivered seriatim from storage into the production document in collated fashion at the position corresponding to the position of the associated original in the multi-page document.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

Figure 1:
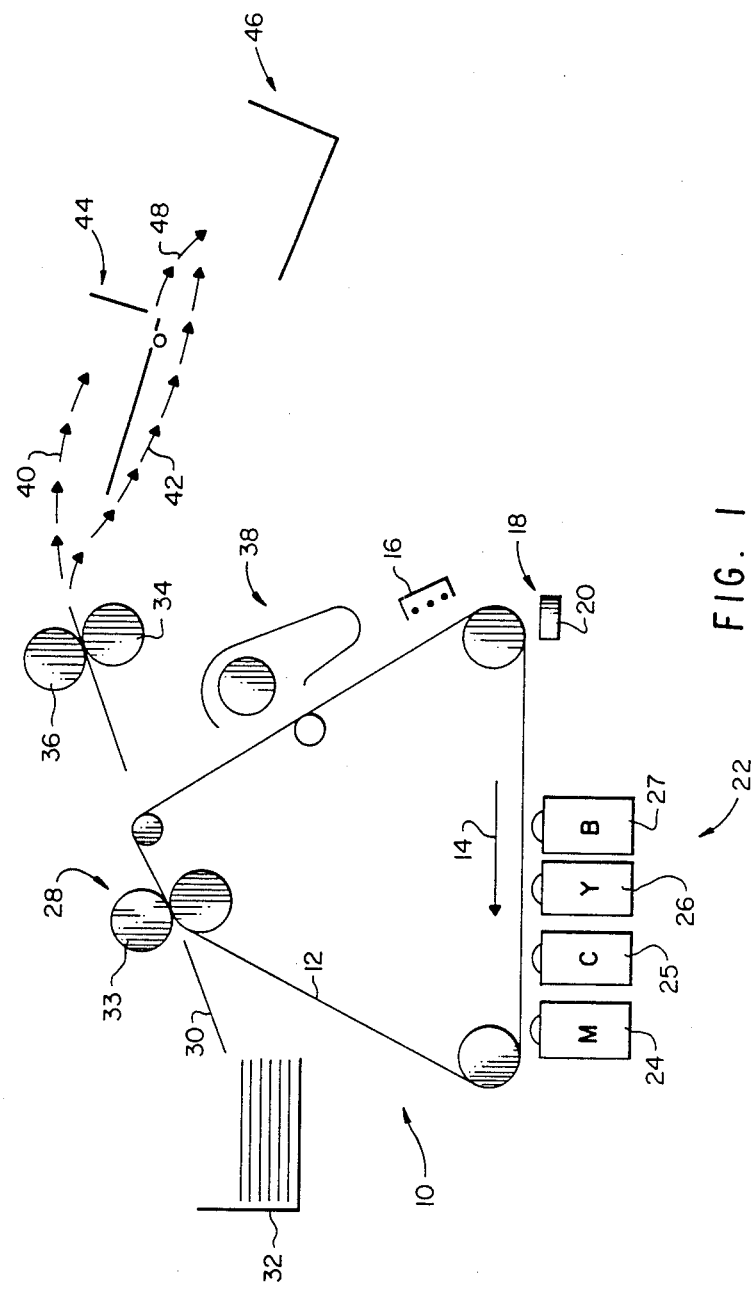
FIG. 1 is a schematic side elevational view of an electrostatographic machine in which the present invention is incorporated.

Referring to FIG. 1, an electrostatographic machine 10 is shown as a light emitting diode (LED) electronic copier/printer, but it is to be understood that other technologies are equally applicable to the present invention. For example, the machine may be a stylus or pin recorder, etc. Electrostatographic machine 10 has an image transfer member such as photoconductive belt 12. Belt 12 is moved in a clockwise direction, as represented by arrow 14.

A charging station 16 applies an electrostatic charge to belt 12. At an exposure station 18, projected light from a write head 20 dissipates the electrostatic charge on the photoconductive belt to form a latent electrostatic image corresponding to the image of an original to be copied or printed. LED write head 20 exposes the photoconductive belt.

The latent electrostatic image on belt 12 is developed with toner at a developer station 22. The developer station is illustrated as having four separate substations 24, 25, 26, and 27 for processing color images; the substations containing magenta, cyan, yellow, and black toner, respectively. The present invention is equally applicable to color machines without a black station; machines with red, yellow, and blue toners; and single-color machines.

As the toner image on belt 12 approaches a transfer station 28, an image receiver sheet 30 is fed from a supply 32. Transfer station 28 includes a transfer drum 33 to which the copy is secured for repeated presentations to belt 12.

When the apparatus is operating in a multi-color mode, consecutive image frames on belt 12 are developed with different colored toners using the different toning substations 24–27. The consecutive developed images are transferred in registry to receiver sheet 30 as it repeatedly is brought into transfer relation with belt 12 by drum 33. After transfer of the toner images to the receiver sheet, the receiver sheet is allowed to follow the belt, for example by removing a vacuum holding it to the drum or by stripping the sheet with a claw or other conventional stripping mechanism, not shown. The receiver sheet is separated from the belt and is passed through a pair of heated fuser rollers 34 and 36. Mechanical and electrical cleaning of belt 12 is effected at a cleaning station 38.

After the pages have passed through fuser rollers 34 and 36, they are selectively directed along one of a pair of paths 40 or 42 to trays 44 or 46, respectively. Tray 46 is a conventional discharge tray, while tray 44 is a firstin, first-out (FIFO) intermediate tray. FIFO tray 44 permits pages to be discharged along a path 48 to tray 46. Selection of tray 44 or 46 for any particular page, and of at what time during the production of a multi-page document a page is released from tray 44 to tray 46 is controlled by machine logic as set forth below.

Figure 2:
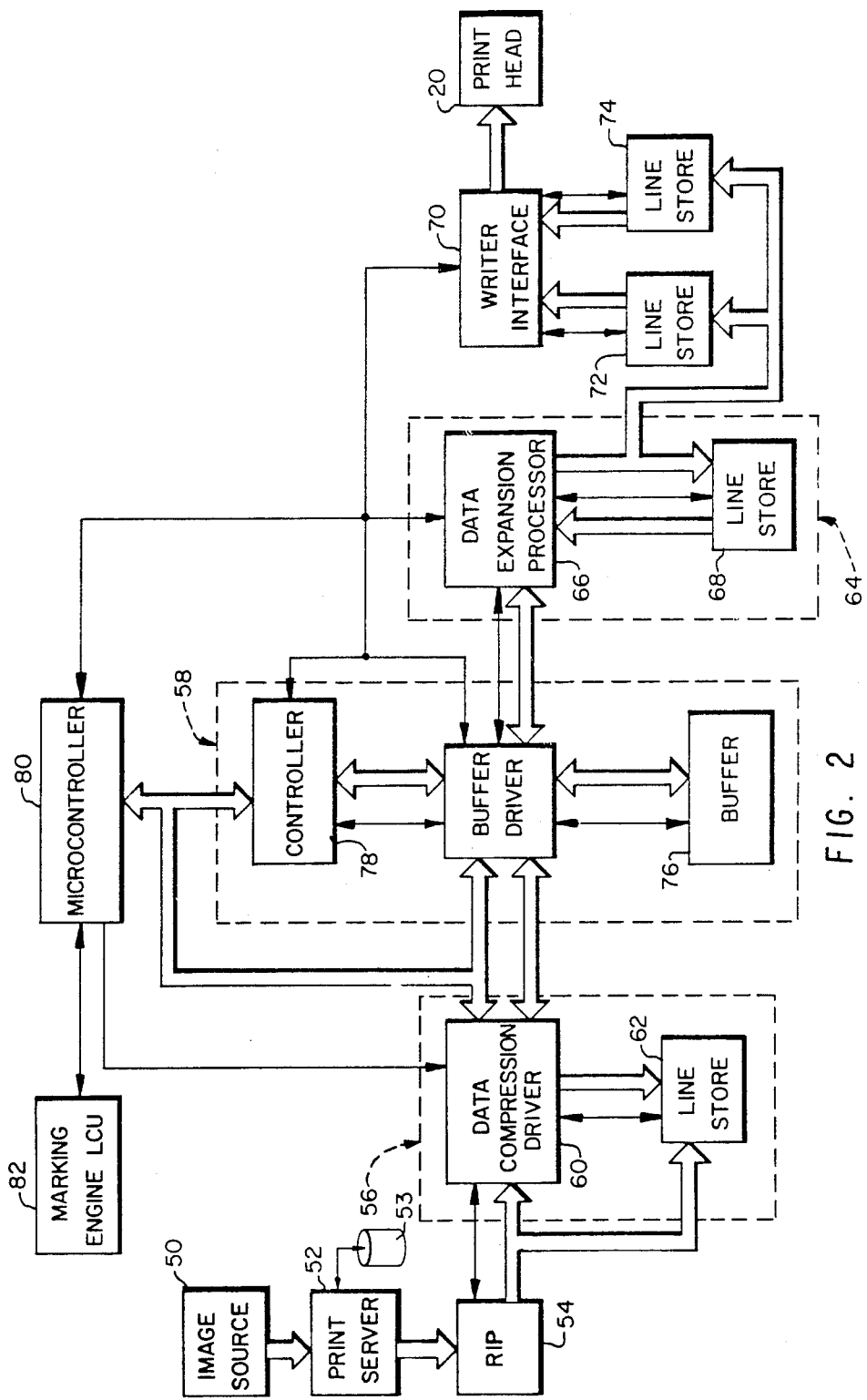
FIG. 2 is a block diagram of the control system of the machine of FIG. 1.

Electrostatographic machine 10 receives electrical image information signals in any of several ways. For example, a document scanner may optically scan hard copy originals and convert the image to a video data stream. Image information may also be obtained from a computer network or a work station as shown in FIG. 2.

Computer work stations, main frames, word processors, and the like (referred to generally as image source 50) produce print jobs as coded signals. Print jobs are queued in a print server computer 52. The print server computer moves the print jobs into a mass storage memory 53, and provides a means to run an algorithm which will determine the sequence that jobs will be retrieved from mass storage and printed. The print server computer spools jobs one page at a time to a raster image processor (RIP) 54. The RIP converts the coded signals to a rasterized video data stream for printing pixel by pixel.

A data compressor receives the image data stream from RIP 54. Data compressor 56 is preferably a hardware implementation of an appropriate algorithm which encodes redundant information into a more compact form before passing the compressed data stream to a multi-page buffer memory 58. A preferred compression algorithm is CCITT Group IV, known to those skilled in the art, but other forms of data compression are available, and reference is made to *Data Compression* by Gilbert Held, 1983, John Wiley and Sons, for examples of various compression techniques. Data compressor 56 includes a data stream compression driver 60 and a line store 62 for buffering a full line's worth of data.

A data expander 64 is the companion to data compressor 56, and it includes a data expansion processor 66 and a line store 68. The expander retrieves the compressed data stream from multi-page buffer memory 58 and reconstructs the output data into original form for a writer interface 70. The writer interface receives a full line of image data from the data expander as the line is processed, and has a pair of line stores 72 and 74 and random logic to resequence the data stream before sending it to print head 20.

Multi-page buffer memory 58 is provided for storing image data to permit the electronic recirculation of images for collation; thereby eliminating the need for a mechanical recirculating document handler. The heart of the multi-page buffer memory is a large bank of dynamic random access memory (DRAM) in a buffer 76 for storage of the image data as it is processed by data compressor 56.

Controller 78 acts as a direct memory access controller, allowing data compressor 56 and expander 64 direct access to DRAM buffer 76 without a microprocessor, and as a DRAM controller arbitrating between memory read, write and refresh cycles.

A microcontroller 80 functions as the system manager, overseeing the overall operation of the multi-page buffer memory. the microcontroller will handle communication with a logic and control unit (LCU) 82 of the marking engine, store the internal pointers identifying the beginning and ending addresses for each image, initiate transfers from the RIP, and control the data compression and expansion process. The microcontroller and LCU 82 comprise electronic collation means for presenting the stored image data for printing in the proper sequence, as often as is needed to produce the desired number of collated document sets, whereby a plurality of electronically collated, multi-page sets can be printed.

When a job is to be printed, print server computer 52 reads the job's pages stored in mass storage memory 53 and selects either all the compressible pages or all the pages which are substantially non-compressible. For purposes of this disclosure, it will be assumed that, since there are usually more compressible pages than non-compressible pages in the typical job, the non-compressible pages are printed first.

Accordingly, all of the non-compressible pages are read from mass storage memory 53 and appropriate markers are left in memory 53. The data is bit mapped and rasterized, and is sent uncompressed to buffer 76. Sufficient productions of these pages are printed and stored in intermediate tray 44 for the number of sets to be made of the job. Thereafter, the balance of the entire job comprising the remaining pages plus the markers, is withdrawn from mass storage memory 53, bit mapped, rasterized, and stored in buffer 76. Finally, collated sets of the stored job is produced, removing a sheet from the intermediate tray each time a marker is encountered.

In copiers having recirculating document feeders, provision may be made for designating originals which would be substantially non-compressible. Designation may be done by any of several known methods, including from operator keyboard, marks on the originals which can be detected by the feeder, key sheets inserted into the multi-page document, etc. Once designated, the multi-page document circulates through the feeder, and the designated originals are scanned, reproduced, and stored in intermediate tray 44. Then, the multi-page document is re-circulated through the feeder a second time, and the non-designated originals are scanned and stored in job buffer 76 for reproduction. At that time, pages stored in tray 44 are withdrawn and inserted in the reproduction sets.

The invention has been described in detail with particular reference to preferred embodiments thereof, but it will be understood that variations and modifications can be effected within the spirit and scope of the invention.

What is claimed is:

1. In a machine adapted to reproduce an original multi-page document from image data of interleaved compressible and substantially non-compressible types of pages to form a reproduction document, the improvement comprising:

multi-page buffer memory;

means for compressing and storing in said buffer memory the image data of the compressible page type;

means for reproducing all pages of said substantially non-compressible type;

means for storing the reproductions of the pages of said substantially non-compressible type;

means for reproducing from said image data stored in said buffer memory all the pages of the compressible type ; and means, operative during the reproduction of the pages of said compressible type, for delivering the reproductions of the pages of said substantially non-compressible type seriatim from said reproduction storage means into the reproduction document in collated fashion at positions corresponding to positions of the associated pages in the original multi-page document.

2. In a machine adapted to produce from electronic image data, a collated reproduction of an original multi-page document containing interleaved compressible and substantially non-compressible types of pages to form a reproduction document, the improvement comprising:

multi-page buffer memory;

means for compressing and storing in said buffer memory image data of the compressible type pages;

means for producing and storing reproductions of all of said substantially non-compressible type pages;

means for producing from said image data stored in said buffer memory reproductions of all of the compressible type pages, and means, operative during the production of said reproductions of the compressible type pages, for delivering said stored reproductions into the reproduction document in collated fashion to form a stack of interleaved page types.

3. The process of reproducing an original mulit-page document from image data of interleaved compressible and substantially non-compressible types of pages to form a reproduction document, said process comprising:

compressing the image data of the compressible page type;

storing the compressed image data in buffer memory;

reproducing and storing all pages of said substantially non-compressible type;

reproducing from the stored compressed image data all the compressible type pages; and during the reproduction of the compressible type pages, delivering the stored reproductions of said substantially non-compressible type pages seriatim into the reproduction document in collated fashion at positions corresponding to positions of the associated pages in the original multi-page document.

4. A process for producing from electronic image data, a collated reproduction of an original multi-page document containing interleaved compressible and substantially non-compressible types of pages to form a reproduction document, said process comprising:

compressing image data of the compressible type pages;

storing the compressed image data in buffer memory;

producing and storing reproductions of all of said substantially non-compressible type pages;

producing from the stored compressed image data reproductions of all of the compressible type pages, and during the production of said reproductions of the compressible type pages, delivering said stored reproductions into the reproduction document in collated fashion to form a stack of interleaved page types.

* * * * *